US012605635B2

(12) United States Patent
Qin et al.

(10) Patent No.: US 12,605,635 B2
(45) Date of Patent: Apr. 21, 2026

(54) NON-FUNGIBLE TOKEN GAME MARKETPLACE SYSTEM AND METHOD

(71) Applicant: A&C Technology, Inc., Newport Beach, CA (US)

(72) Inventors: Han Qin, Newport Beach, CA (US); Jiayang Qin, Newport Beach, CA (US); Ye Zhao, Newport Beach, CA (US)

(73) Assignee: A&C Technology, Inc., Newport Beach, CA (US)

( * ) Notice: Subject to any disclaimer, the term of this patent is extended or adjusted under 35 U.S.C. 154(b) by 13 days.

(21) Appl. No.: 17/969,594

(22) Filed: Oct. 19, 2022

(65) Prior Publication Data

US 2024/0131436 A1 Apr. 25, 2024
US 2024/0226749 A9 Jul. 11, 2024

(51) Int. Cl.
| | |
|---|---|
| *A63G 31/00* | (2006.01) |
| *A63F 13/30* | (2014.01) |
| *A63F 13/60* | (2014.01) |
| *A63F 13/77* | (2014.01) |
| *G06Q 40/04* | (2012.01) |

(52) U.S. Cl.
CPC .............. *A63F 13/60* (2014.09); *A63F 13/30* (2014.09); *A63F 13/77* (2014.09); *A63F 2300/6009* (2013.01)

(58) Field of Classification Search
CPC ....... H04L 9/3213; H04L 9/3247; H04L 9/50; H04L 2209/56; H04L 2209/60; A63F 13/69; A63F 13/71; A63F 13/73; G06Q 20/1235; G06Q 20/367; G06Q 20/38215; G06Q 20/401; G06Q 30/0208; A63G 31/00
See application file for complete search history.

(56) References Cited

U.S. PATENT DOCUMENTS

| | | | | |
|---|---|---|---|---|
| 2023/0009908 A1* | 1/2023 | Castinado | ............. | H04L 9/0819 |
| 2023/0079127 A1* | 3/2023 | Benedetto | .............. | A63F 13/69 |
| 2023/0114235 A1* | 4/2023 | Eivy | ..................... | G06T 19/006 705/66 |
| 2023/0138023 A1* | 5/2023 | Yang | ....................... | A63F 13/79 463/42 |
| 2023/0347257 A1* | 11/2023 | Jordan | ................... | G06Q 40/04 |
| 2023/0368168 A1* | 11/2023 | Oh | ..................... | G06Q 30/0208 |
| 2023/0377056 A1* | 11/2023 | Yang | ....................... | A63F 13/67 |
| 2024/0046250 A1* | 2/2024 | Meyers | ............... | G06Q 20/389 |
| 2024/0064019 A1* | 2/2024 | Gagne-Keats | ........... | H04L 9/50 |

* cited by examiner

*Primary Examiner* — Lawrence S Galka
(74) *Attorney, Agent, or Firm* — Cohen IP law Group PC; Michael H. Cohen

(57) ABSTRACT

A system, marketplace, and method for developers to develop and provide games and/or non-fungible tokens (NFTs) to users for use across multiple gaming environments is provided. The system provides tools enabling the developers to implement games and/or NFTs that are compatible with multiple gaming environments standards. The system also converts information pertaining to the NFTs from non-standardized formats to standardized formats as required by the different gaming environments. The system also provides a marketplace for developers to showcase their games and/or NFTs to potential users. The system also links new and/or existing user accounts from various games with a system account such that the users may only require use of the system account across all of the games in the marketplace.

9 Claims, 11 Drawing Sheets

Mint Request 231 via Mint API 124

Choose the NFT Needed to be Burn 232

Submit 233

Verify the Request 234

Approve the Request 235

Remove the NFT Items from Marketplace 236

Upload the Original Games Database 237 via Updated API 123

700

Game Title 701

NFT Item 711

Description 713

Price 712

Price History Chart 714

1. Event1 From1 To1 Price1 Time1 715
2. Event2 From2 To2 Price2 Time2 716
3. Event3 From3 To3 Price3 Time3 717

Review 718

NON-FUNGIBLE TOKEN GAME MARKETPLACE SYSTEM AND METHOD

FIELD OF THE INVENTION

This invention relates to gaming, including a gaming system and marketplace for games and non-fungible tokens (NFTs).

BACKGROUND

It is a well-known practice for game developers to offer in-game assets to game players for use within particular gaming environments. For example, players may purchase unique articles of clothing for their in-game avatars to wear, specialized tools for the avatars to use during the game play, weapons for the avatars to use during game play combat, and other types of assets.

However, such in-game assets are difficult to track and/or authenticate. For example, a game developer may release an in-game asset marked as "rare" while stating that only a small number of the assets will be made available for sale to players. This practice may cause the price of the asset to increase, but players are not able to readily verify the number of assets released by the developer and/or purchased by other users. Accordingly, the players are required to simply trust the developers regarding the scarcity and/or sales of the assets.

To solve this issue, developers are developing in-game assets as Non-Fungible Tokens stored on a blockchain. In this way, the NFT assets may be directly authenticatable and traceable by any user at any time.

However, requirements for NFTs vary from game to game, thereby requiring developers of NFTs to develop unique versions of the NFTs for each game they are designed to work with. This causes an increase in the time and money required to develop the NFTs.

Accordingly, there is a need for an NFT game marketplace system and method that enables developers to quickly develop NFTs for use within multiple games. There also is a need for a system and method that provides a marketplace for developers to showcase their games and NFTs, and for players to research and obtain the games and NFTs. These and other aspects are described herein.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification. None of the drawings are to scale unless specifically stated otherwise.

DETAILED DESCRIPTION OF EXEMPLARY EMBODIMENTS

As used herein, unless used otherwise, the following terms and abbreviations have the following meanings:

Non-Fungible Token (NFT) is a financial security comprising digital data stored on a blockchain. NFTs typically contain references to digital files and/or assets such as in-game content, images, graphics, photographs, video, audio, and other types of files. Once on the blockchain, the NFT is effectively immutable. As such, information such as authenticity, ownership, rarity, sale, and price history, etc. is easily verified and indisputable.

Minting an NFT means to publish an NFT on a blockchain to make it purchasable.

Burning an NFT means to send the NFT to a verifiable inaccessible address, effectively removing access to the NFT from circulation. Notably, however, the burning transaction will remain on the blockchain ledger.

Gaming Environment is generally defined as the environment, background, and/or layout (e.g., the computer controlled digital setting or virtual world) in which player characters interact with other player characters and with NPCs. Gaming environments may be 2D and/or 3D, and may be supported using any type of gaming device, including, but not limited to, smart phones, tablet computers, laptops, desktop computers, gaming consoles, virtual reality (VR) headsets and systems, augmented reality (AR) systems, mobile media players, etc.

An application programming interface (API) is a set of rules and protocols that define how applications or devices may connect to and communicate with one other.

In general, the system according to exemplary embodiments hereof provides a gaming system, marketplace, and method. In some embodiments, the system provides a marketplace for developers to showcase their games and/or NFTs to potential users. In doing so, the marketplace provides a platform for users to research and potentially register with (e.g., purchase) a wide variety of games and/or NFTs from different developers in one place. The system provides tools to the developers enabling them to provide games and/or NFTs that are compatible with the platform and with games and/or NFTs on the platform from other developers. The system also links new and/or existing user accounts from various games with a system account such that the users may only require use of the system account across all of the games in the marketplace.

Figure 1:
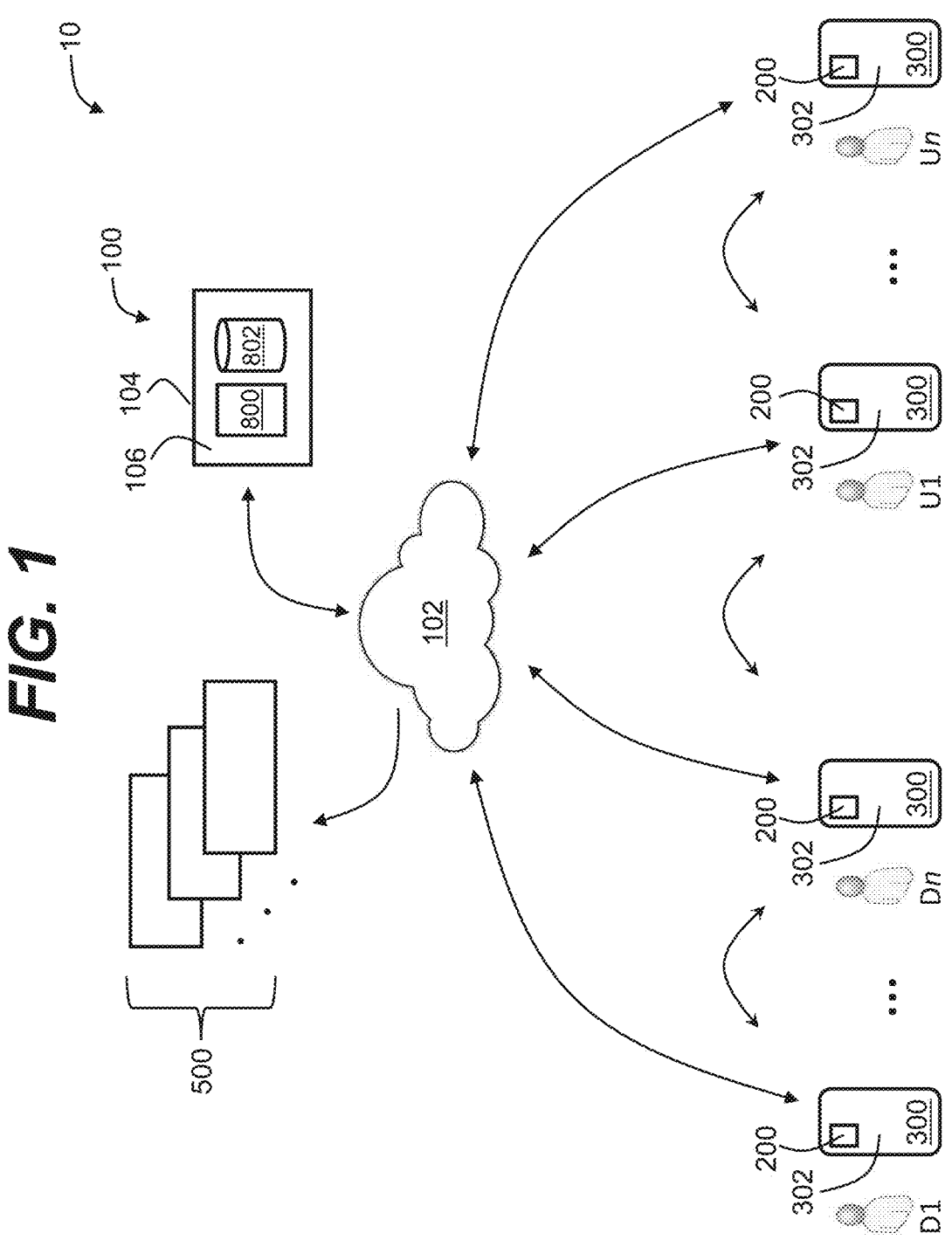
FIG. 1 shows an overview of a gaming system in accordance with exemplary embodiments hereof.

FIG. 1 shows an overview of an exemplary framework for an NFT gaming system 10 (also referred to herein as simply the system 10) according to exemplary embodiments hereof. As shown, the NFT gaming system 10 may include a backend system 100 that may interface with gaming and/or NFT developers D as well as users U of the system 10 (e.g., players) (individually and/or collectively) via one or more application interfaces 200 (e.g., a mobile application or "app", a computer application, a game console application, a browser, website or Internet interface, or other type(s) of applications) running on one or more computing devices 300 (e.g., smart phones, tablet computers, laptops, desktop computers, gaming consoles, mobile media players, etc.). It is understood that the system 10 may interface with any number of developers D and/or users U at any time. The system 10 also may include other systems, elements and components as required by the system 10 to fulfill its functionalities.

The system 10 may interface with various external entities and/or systems 500 such as providers of available gaming environments. For example, and as described in other sections, the system 10 provides an interface and necessary protocols (e.g., APIs, SDKs, etc.) for third-party developers of games and/or NFTs to develop, upload, link, and/or otherwise integrate their games and/or NFTs into the system 10. The system 10 may then make the games and/or NFTs available and compatible with other various gaming environments of interest. This will be described in detail in other sections.

The backend system 100 includes one or more servers 104 including one or more software systems 106, one or more applications 800, and one or more databases 802. The one or more software systems 106 may include operating systems, system software, web server software, social networking software, communication software, software applications, scripts, firmware, other types of software systems, and any combinations thereof. The applications 600 and databases 700 will be described in other sections.

The computing devices 300 and the backend controller 100 may preferably be connected to one or more networks 102 (e.g., the Internet, LAN, WAN, wireless communication systems, cellular communication systems, telephony or other types of communication systems or protocols) and may communicate thereby. In some embodiments, the backend controller 100 may include a cloud platform (e.g., one or more backend servers), one or more local controllers, or any combination thereof. In some embodiments, the backend controller 100 includes a cloud platform that interfaces with one or more local controllers. For example, administrators of the system 10 may interface with the system 10 via a local controller in communication to a cloud platform.

In some embodiments, the application 200 ("app") provides one or more graphical user interfaces (GUIs) that enable a developer D and/or a user U to interface with the application 200, the backend 100, and the overall system 10. The application 200 may generally provide an interface 302 with which the user U may receive visual, audible, haptic, and other types of multimedia content (e.g., a gaming environment). The interface 302 also may enable the developers D and/or users U to enter information for the system 10 to utilize (e.g., upload to the backend 100), and provide interface controls (e.g., touchscreen buttons, game controllers, etc.) for the developers D and/or users U to activate while interacting with the system 10. The application 200 also may display data and other types of information that the developers D and/or users U may read or otherwise consume and/or provide to other developers D and/or users U. In general, and in some embodiments, the application 200 may provide a primary interface 302 with which the developers D and/or users U may interact with the system 10.

In general, the system 10 enables developers D to create games and/or NFTs for users U to acquire, play, and/or use in one or more available gaming environments. The system 10 provides a specific set of tools to the developers D for the development of the games and/or NFTs such that once developed, the games and/or NFTs may be compatible and made available for use in the available gaming environments. The system 10 also enables users U to obtain the NFTs for use in the gaming environments that he/she may desire.

As is known in the art, different gaming environments may include specific and/or unique requirements for the development and/or use of NFTs within each specific environment. In this case, a developer D may be required to develop distinct NFTs for each different gaming environment he/she may wish to work with. The requirements may include technical requirements, procedural requirements, and/or other types of requirements. For example, gaming environment A may require a first set of NFT requirements, gaming environment B may require a second set of NFT requirements, and gaming environment C may require a third set of NFT requirements, with the first, second, and third set of requirements unique and distinct from one another. In this scenario, the developer D is required to develop three distinct NFTs, including one that satisfies the first set of requirements, one that satisfies the second set of requirements, and one that satisfies the third set of requirements. Having to develop individual NFTs for each gaming environment clearly includes a significant amount of additional work, time, and money, thereby making the process inefficient.

Conversely, the system 10 provides tools that the developers D may use to develop a single NFT, with the system 10 then making the NFT compatible, e.g., through development/translation/conversion, with the various gaming environments of interest. Using the example above, a developer D may develop an NFT using the system 10, and the system 10 may then make the NFT compatible with gaming environments A, B, and C, without any further work required from the developer D.

It is understood that the example above is meant for demonstration and that the system 10 may be used with any available gaming environments.

Figure 2:
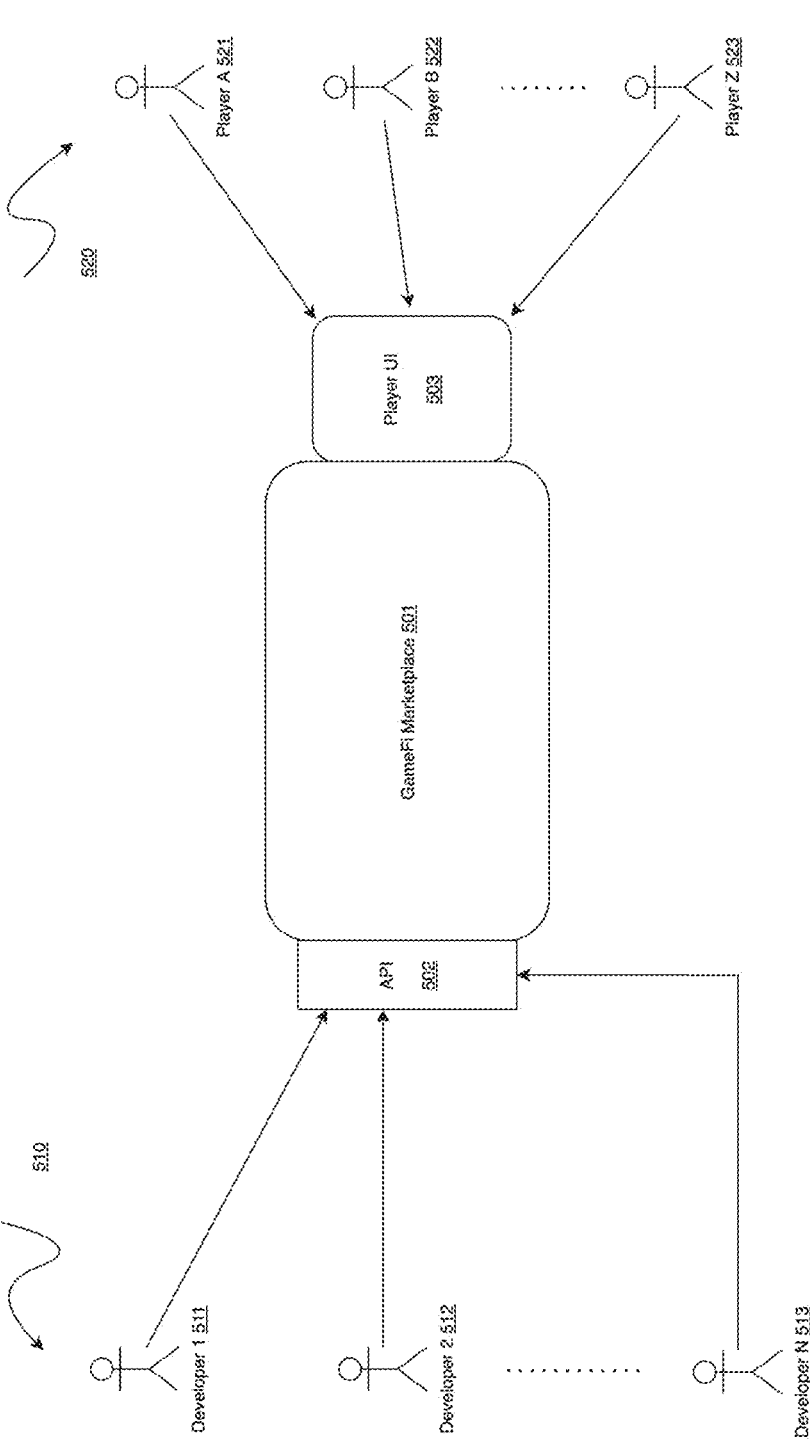
FIG. 2 shows an overview of a gaming system and marketplace in accordance with exemplary embodiments hereof.

FIG. 2 shows a block diagram showing aspects of the system 10. As shown, the system 10 includes a marketplace 12 that may be used to showcase gaming items for sale (e.g., NFTs), games available to play (e.g., games linked with the system 10), and other elements. The system 10 also provides a set of application programming interfaces (APIs) 111 for developers D for use in developing NFTs that will be made compatible with and available to the games linked with the system 10. Games linked with the system 10 may include games developed by the developers D themselves and/or other games developed by other entities. In this way, developers D may use the APIs to develop NFTs based on their existing games and/or for other available games. Developers D also may use the APIs to develop new games with new NFTs made specifically for each new game. Once developed, the NFTs (and/or games) may be included in the system marketplace 12 for users U to review, obtain (e.g., purchase, trade, etc.), and/or utilize.

In some embodiments, as shown in FIG. 2, the system 10 also provides a user interface (UI) 113 for the users U to interact with the system 10 (e.g., with the marketplace 12) to acquire NFTs and to use the NFTs in various gaming environments while playing the games.

In some embodiments, as shown in FIG. 2, a plurality of developers D (all independent form one another) may join the system marketplace 12 by embedding the applicable APIs to create their own unique main interfaces (e.g., homepages) in the system marketplace 12. These main interfaces may be used to introduce the developers' game(s), publish NFTs, display NFTs, as well as other NFT operations that may enable users U to search, understand, research and trade in the system marketplace 12. In some embodiments, the developers D may cast NFTs for their own games through the Mint API, and simply enter the NFTs into the system marketplace 12 to start circulation through the Mint API. In this way, the developers D may no longer need to worry about the series of updates to their games needed to develop NFTs and the market after the NFTs are minted. The developers D also may destroy or revoke one or more of their own NFTs from the market 12 through use of the burn API. In addition, developers D also may issue their own tokens in the system marketplace 12 through use of the issue API.

In some embodiment, as shown in FIG. 2, multiple developers D may independently develop their own NFTs in parallel through the use of the APIs provided by the system 10. In this way, users U may discover game titles and associated NFTs from different developers D in the single marketplace 12. This creates a market network effect for both the developers D and the users U.

In some embodiments, the marketplace 12 includes a shopping cart, checkout, and payment features. As is known in the art, current cryptocurrency transactions may require the ownership and use of a digital wallet. However, such digital wallets may oftentimes be difficult to understand and use for some users U (e.g., use of a digital wallet for cryptocurrency transactions may require the user U to understand public key/private key digital signatures). Accordingly, in some embodiments, the system marketplace 12 may securely host a private key for each user U within a system database. In this way, the user U may checkout using a credit card (and/or other online payment means) and the system 10 may process the cryptocurrency transaction on its end, thereby saving the user U from having to obtain a cryptocurrency digital wallet of their own.

In some embodiments, as shown in FIG. 2, a plurality of users U (all independent from one another) may interact with the marketplace 12 simultaneously and in real time. Each user U may register his/her system 10 account using the user interface 113, select a game developer D within the marketplace 12 that he/she may be interested in, and use the Link API (called by the game developer D) to link his/her system 10 account with the selected game account. In this way, users U need only to use their system 10 account to synchronize operations between the marketplace 12 and each game developer's account they have chosen.

These and other aspects of the system 10 will next be described in further detail with particular reference to the developers D and the users U.

Developers D

Figure 3:
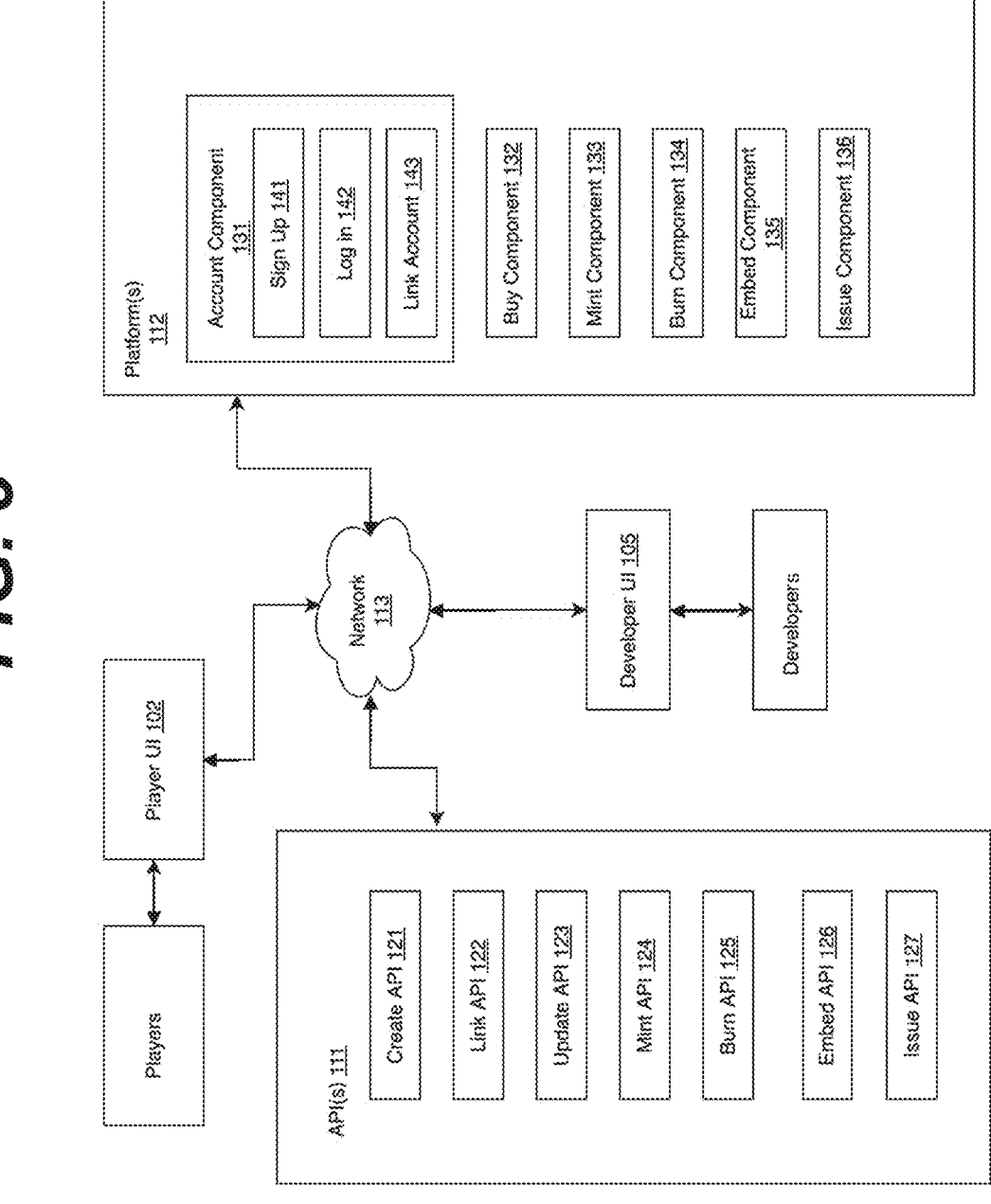
FIG. 3 shows an overview of a gaming system in accordance with exemplary embodiments hereof.

For developers D, the system 10 provides a platform through which the developers D may develop and provide NFTs to users U for use in one or more gaming environments. In some embodiments, as shown in FIG. 3, the system 10 provides one or more APIs 111 which enable game developers to develop and easily integrate an NFT feature into a new or existing game without the hurdles of traditional NFT development. The APIs 111 may be RESTful APIs, other types of APIs, and any combinations thereof.

The developers D also may develop and/or provide gaming environments for use through the system 10.

In some embodiments, as shown in FIG. 3, the system 10 provides at least some of the following APIs 111:

Create API 121;
Link API 122;
Update API 123;
Mint API 124;
Burn API 125;
Embed API 126;
Issue API 127; and
Other APIs.

In some embodiments, the create API 121 enables developers D to provide users U with an interface for registering a new account. Users U do not need to cross-platform to register an account of selected developers D on the system 10, thereby eliminating cross-platform operating costs.

The link API 122 enables developers D to provide users U with an interface for connecting their system 10 account with their existing game account(s) in the developer's game. Accordingly, users U can link their system 10 account with an already owned game account on the system 10 without cross-platform. Subsequently, all operations on the system 10 may be synchronized and updated in the game simultaneously thereby reducing the operating cost of the system 10.

The update API 123 enables developers D to synchronously update the data status of both accounts (the system 10 account and the native game account) each time a user U makes an NFT purchase. Every NFT transaction by a user U on the system 10 may update the status in the user's account in the game through the update API 123, reducing operation time and cost.

The minting API 124 enables developers D to mint their own game NFTs on the system 10, and the burn API 125 enables developers D to destroy their game NFTs on the system 10.

The issue API 127 enables developers D to issue their own tokens on the system 10. The developer D may then award tokens to users U based on certain factors such as the user's time spent playing the game, the user's rank within the game, the user's NFT assets, and/or other factors.

In some embodiments, as shown in FIG. 3, the system 10 contains one or more functional components 130 (also referred to herein as applications) implemented by machine-readable instructions, including but not limited to:

Account component 131;
Buy component 132;
Mint component 133;
Burn component 134;
Embed component 135;
Issue component 136; and
Other components.

In some embodiments, the mint component 133 enables developers D to mint their NFTs and the burn component 134 enables developers to remove ("destroy" or otherwise make inaccessible) their NFTs. The embedding component 135 enables developers D to embed their NFTs into one or more webpages (or other types of applications), e.g., within the system 10, for presenting, marketing, and/or otherwise making available the NFTs to the users U. In some embodiments, the developers D may utilize the tools provided by the system 10 to create their own webpages (homepages) to display their NFTs. The issue component 136 enables developers D to issue their own tokens within the system 10 for users U to purchase and subsequently use to purchase NFTs of interest.

In some embodiments, developers D embed the system 10 for the first time through use of the embed API 126 during and/or after which the developer D may design and construct their own homepage on the system 10. The homepage may be used to introduce and promote the developer's game and/or NFT content, mechanics, features, etc. to the users U. The homepage also may be used for subsequent users' NFT transactions and NFT issuance and management. In addition, developers D may easily and conveniently mint and/or destroy their NFTs in existing games using the mint API 124 and burn API 125, respectively. These actions may be synchronized throughout the available games and on the system 10, thereby reducing development, time, and marketing costs. In addition, developers D also may issue their own tokens through the issue API 127 for users U to purchase and use to acquire NFTs on the system 10.

Figure 4:
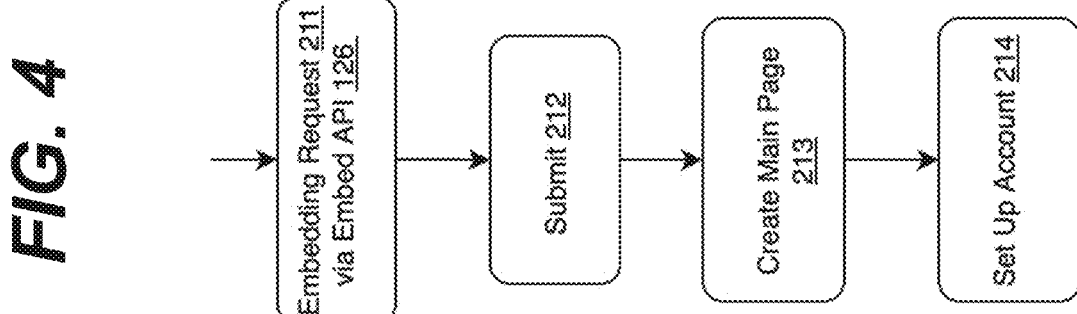
FIGS. 4-6 show actions a developer may take using a gaming system in accordance with exemplary embodiments hereof.

FIG. 4 shows actions that a developer D may take to embed the system 10. In some embodiments, the developer D submits an embed request (at 211) to the system 10 through the embed API 126. At 212, the developer D submits the information required by the system 10, including but not limited to, game content, game features, game homepage, game logo, game items, game history, game development, game NFT introductions, and/or other information. Then, at 213, the developer D creates his/her homepage on the system 10. The homepages preferably enable the developers D to market their items to users U, provide promotions, and generally follow-up with NFT issuance and management. The system 10 may approve each homepage after which the developer's account may be set up at 214. The developer D may then be provided with an API key or OAuth token for future communication with the system 10.

Figure 5:
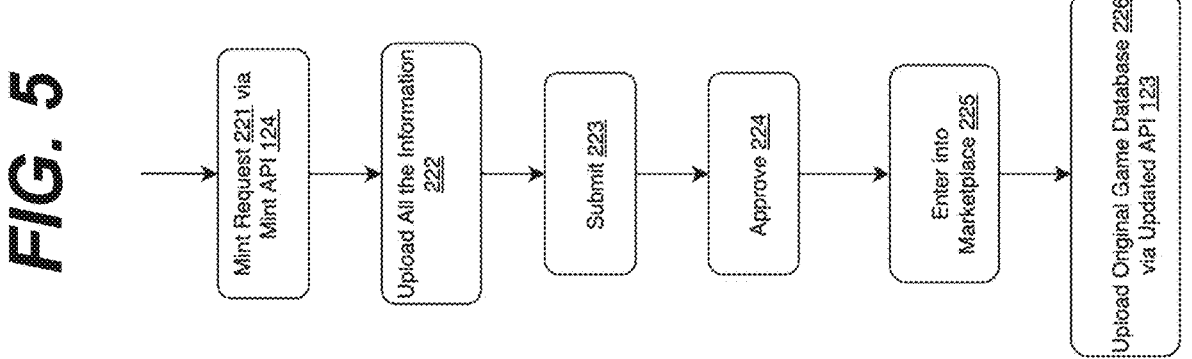

FIG. 5 shows actions that a developer D may take to mint an NFT in the system 10. As described above, minting an NFT refers to converting digital game items into digital assets stored on the blockchain. The digital items or files are stored in a decentralized database or distributed ledger and cannot be edited, modified, or deleted. Anyone can view the attributes of the minted NFT item which creates the trust in the marketplace.

In some embodiments, the developer D submits a minting NFT request (at 221) to the system 10 through use of the minting API 124. At 222, the developer D uploads the information required to mint the NFT, including but not limited to, a picture that enables the NFT to be identified, a detailed description of the NFT, a description of how the NFT is played, the price of the NFT, the quantity of the NFT, and other information. The developer D submits the NFT-related information at 223 and the submission is approved at 224. Once the submission is approved, the developer D submits a minting NFT request (at 225) for the NFT to be minted into the system 10 and displayed in the integrated system marketplace 12. Meanwhile, at 226, the system 10 synchronously updates the data in the native game in real-time through the update API 123 called in advance by the developer D, to maintain the data consistency between the system marketplace 12 and the game of the native game developer D.

Figure 6:
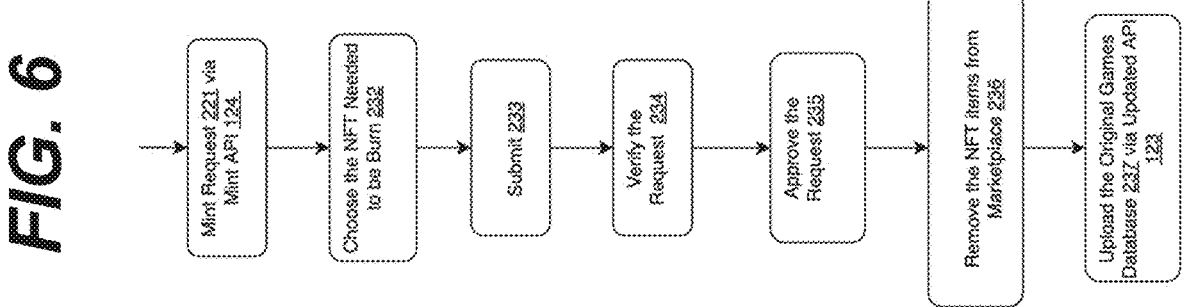

FIG. 6 shows actions that a developer D may take to burn an NFT in the system 10. Burning an NFT sends the NFT to a verifiable un-spendable address, effectively removing the NFT from the blockchain. Notably, the burning transaction will remain on the blockchain ledger.

In some embodiments, the developer D submits an NFT burning request (at 231) to the system 10 through use of the burn API 125. At 232, the developer D selects the NFT to be destroyed (e.g., on the game homepage) and submits a burning application (at 233). The system 10 confirms the request at 234 and the developer D submits a final request to burn the NFT that he/she owns at 235. Then, at 236, the system 10 removes the game NFT from the system marketplace 12. The system 10 updates the database (at 237) in the game developer's native game through use of the update API 123 to ensure the data consistency between the system marketplace 12 and the game of the native game developer D.

In some embodiments, during and/or after the NFT development process, the system 10 converts/transforms NFTs provided by developers D in a non-standardized format into a standardized format for use with one or more available gaming environments. In other embodiments, the system 10 converts/transforms each NFT into one or more different formats, with each format compatible with one or more different gaming environments. For example, using the example from above, the system 10 may convert/transform an NFT provided by a developer in an initial format into a first format for use with gaming environment A, into a second format for use with gaming environment B, and into a third format for use with gaming environment C.

In some embodiments, the conversion/transformation of the NFTs occurs during the development process of each NFT through use of the tools (e.g., the APIs) that the system 10 provides to each developer D. In other embodiments, the system 10 converts/transforms the NFTs after the developer D has completed his/her development of the NFTs and has provided the NFTs to the system 10 for implementation.

Users U

For users U, the system 10 provides a platform through which users U may obtain NFTs from various developers D for use in one or more gaming environments. In some embodiments, the system 10 includes a system marketplace 12 (e.g., an NFT marketplace).

As is known in the art, a user U may have previously registered with one or more games in order to participate in the environments the games may offer. In addition, a user U may be interested in registering with additional games to participate in additional gaming environments.

In some embodiments, the system 10 provides a platform enabling the user U to simply log into the system 10 using a single set of system 10 credentials, and the system 10 links the user's system 10 account with his/her other gaming accounts of interest. In this way, the system 10 provides a linkage between the user's system 10 account and his/her individual game accounts.

In some embodiments, the system 10 provides the applications necessary for a user U to register a system 10 account. In some embodiments, the system's account component 131 includes a sign-up component 141 (used to register), a login component 142 (used to log into the system 10 with account credentials), and a link account component 143 (used to link system 10 accounts with other gaming environment accounts).

In use, a user U may register with the system 10 to create a system 10 account and may subsequently log into the system 10 using the login component 142 to perform subsequent operations. Users U also may use the link account component 143 to select a developer D already embedded in the system 10 to create a new native game account or to associate an existing native game account with his/her system 10 account. In this way, the embedded games of interest may be accessed through the single system 10 account. The system 10 account may then be used to perform subsequent game NFT operations.

In some embodiments, a user U may link his/her system 10 account with one or more native game accounts of selected games through use of the link account component 143. If the user U does not already have a native game account, he/she may register a new game account directly with the selected game through the create API 121 (which the developer D preferably set up in advance). If the user U already has a native game account, he/she may directly connect his/her system 10 account with the native game account through use of the link API 122 (which the developer D preferably set up in advance). In this way, all the user's operations on the system 10 may be directly synchronized in the native game account through the update API 123, without the need for multiple cross-platform operations. In addition, any NFT traded, purchased, or otherwise acquired through the system marketplace 12 may be used in the selected game, greatly reducing the operating and time costs.

Figure 7:
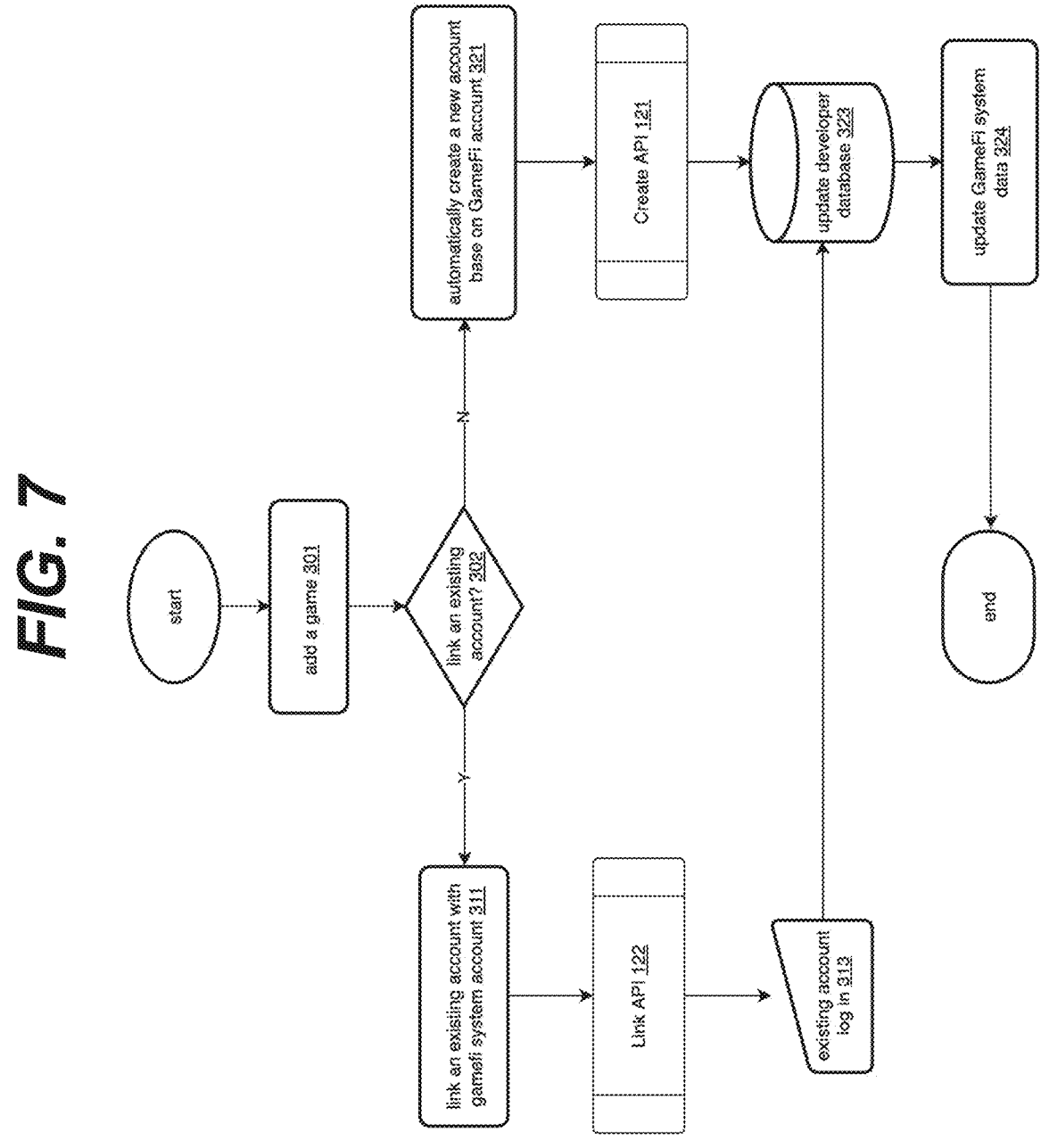
FIGS. 7-8 show actions a user may take using a gaming system in accordance with exemplary embodiments hereof.

FIG. 7 shows actions that a user U may take to link a system 10 account with a native game account, thereby achieving data consistency between the system 10 and developers' native games. In some embodiments, there may be a one to one matching of the system 10 account ID with the specific game account ID. In some embodiments, the game account ID may be the same as the system 10 account ID as some games may use the system 10 account authentication system. Because some users U may find it difficult to remember different usernames and passwords for each game they may play, the link account component 143 enables users U to securely log into multiple games securely with a single username and password.

In some embodiments, a user U selects a game and adds it to his/her homepage at 301. The user U connects his/her system 10 account with the native game account of the selected game, and at 302, the player decides whether to connect an existing native game account. If the existing native game account is connected (at 311), the user U may connect with the existing native game account through use of the link API 122 (preferably called by the developer D). The system 10 may then synchronously update the database of the developer D (at 323) through use of the link API 122 coupled with the operation of the user logging into the existing native game account at 313, to achieve synchronization consistency between the two accounts.

If, however, instead of connecting an existing native game account, a new native game account is to be created at 321, the system 10 creates a new native account in the game added by the player through use of the create API 121 (preferably called by the developer D). Then, at 323, the system 10 synchronously updates the database of the developer's native game to include the new native game account, and at 324, synchronously updates the data of the system 10 in real-time to ensure the synchronization consistency of the two accounts.

Figure 8:
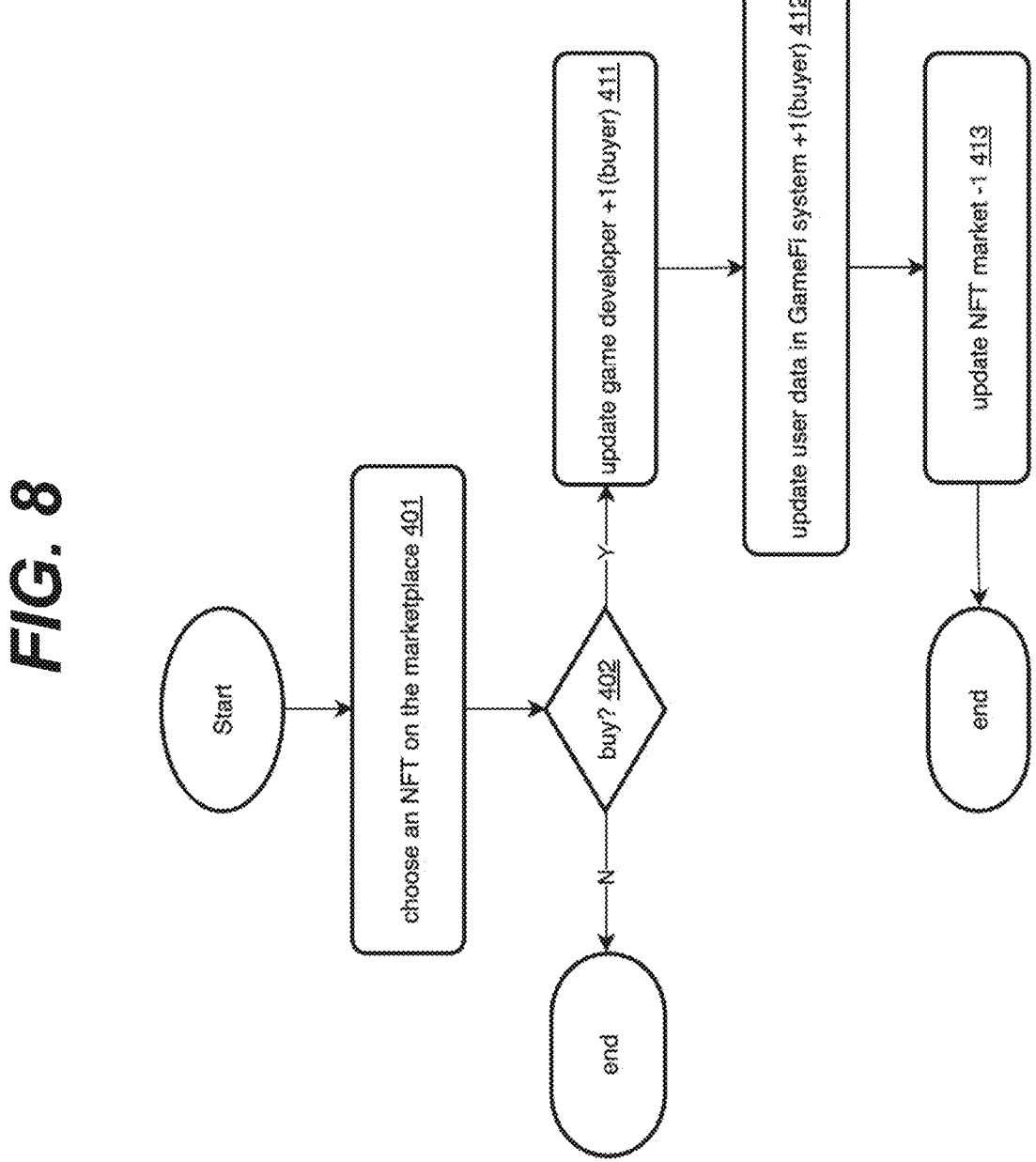

FIG. 8 shows actions that a user U may take to purchase an NFT in the system marketplace 12. In some embodiments, the user U identifies an NFT to purchase in the system marketplace 12 (at 401) and decides whether to buy the NFT (at 402), e.g., after checking the corresponding information and price. If the user U decides to buy, the system 10 updates the data of the player's account in the developer's native game database through use of the updating API 123 (at 411). In some embodiments, the updating API 123 may include a callback and/or webhook in the developer's system. Next, at 412, when the purchase event fires, the webhook may capture the information automatically and update the user data in the NFT marketplace 12 on the blockchain. The system 10 also may simultaneously update the data of the system 10 (e.g., the marketplace data and front-end information) and remove the purchased NFT from the system marketplace 12 (at 413). The purchase transaction is recorded in the blockchain to indicate the date, the new owner, and price of the NFT transaction. By storing the information to the blockchain, the transaction record creates a fair and transparent game marketplace.

Figure 9:
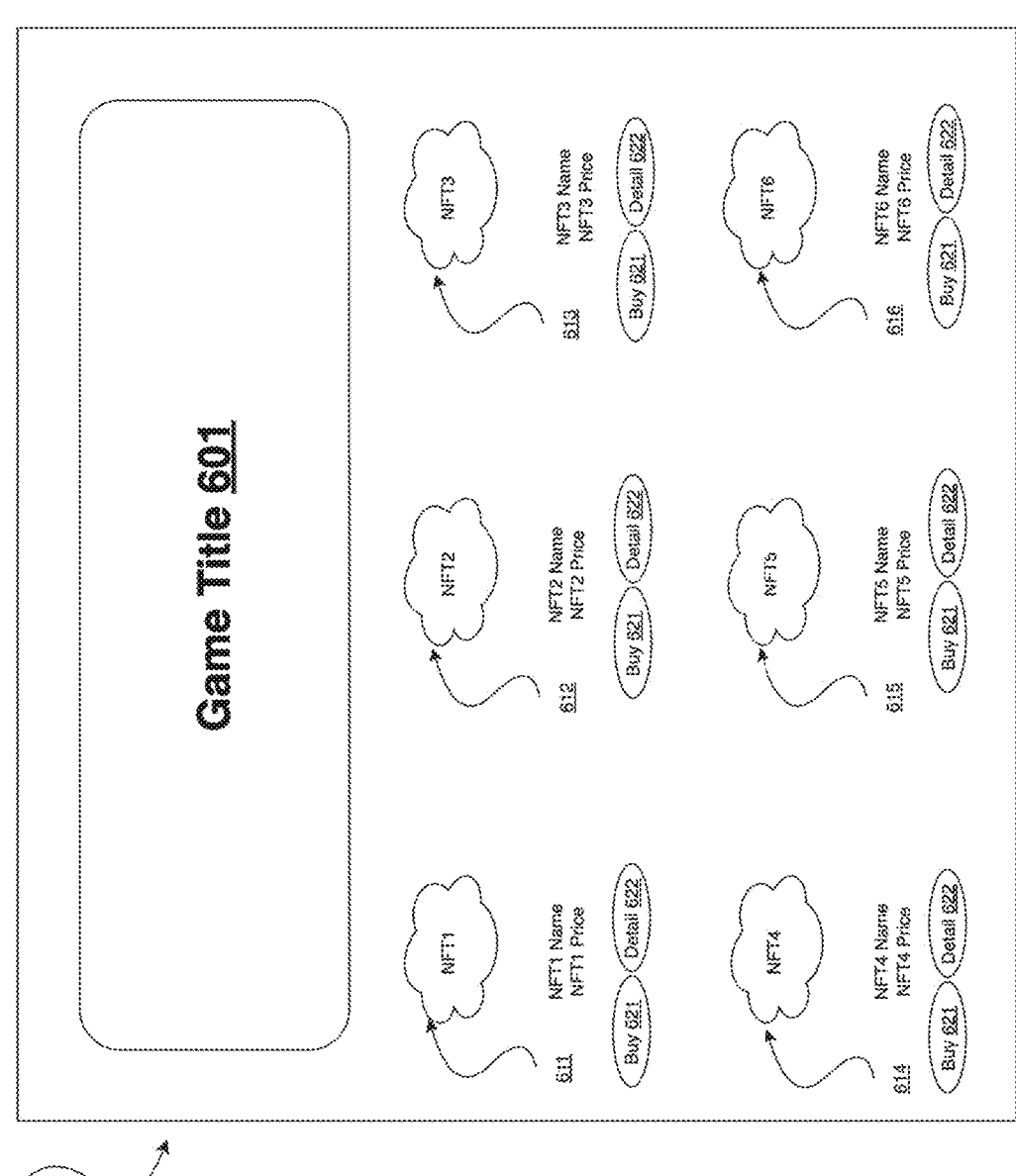
FIGS. 9-10 show example interfaces of a gaming system in accordance with exemplary embodiments hereof.

FIG. 9 illustrates an example user interface 600 where different NFT game items may be displayed in the marketplace 12. The user interface 600 may include a web page, an iOS app, an Android app, and/or other types of interfaces. In some embodiments, the developer D of the NFT and/or game for sale may customize the interface 600 through use of the APIs 111. For example, the interface 600 may include a game title 601, game images, game summaries, and/or other information.

In some embodiments, the interface 600 also may include information regarding one or more NFTs available for use within the game. For example, the interface 600 may include images of each available NFT, along with other information, e.g., the title, price, details, etc. It is understood that the interface 600 may include any type of information for each NFT and that each NFT may be presented in a similar fashion compared to other NFTs, and/or in a unique fashion compared to other NFTs.

In some embodiments, the interface 600 also may include an option to purchase an NFT using the buy option 621, and/or to learn more about the NFT using the details option 622. If the user U clicks the buy option 621, he/she will be taken to the checkout to complete the purchase.

In some embodiments, a user U may search through the marketplace 12 and the various interfaces 600 using a search field, tags, filters, etc. Filters may filter search results based on price, popularity, game type, release date, etc. In this way, users U may find, purchase, and play a variety of games and a variety of NFTs all in one marketplace 12.

Figure 10:
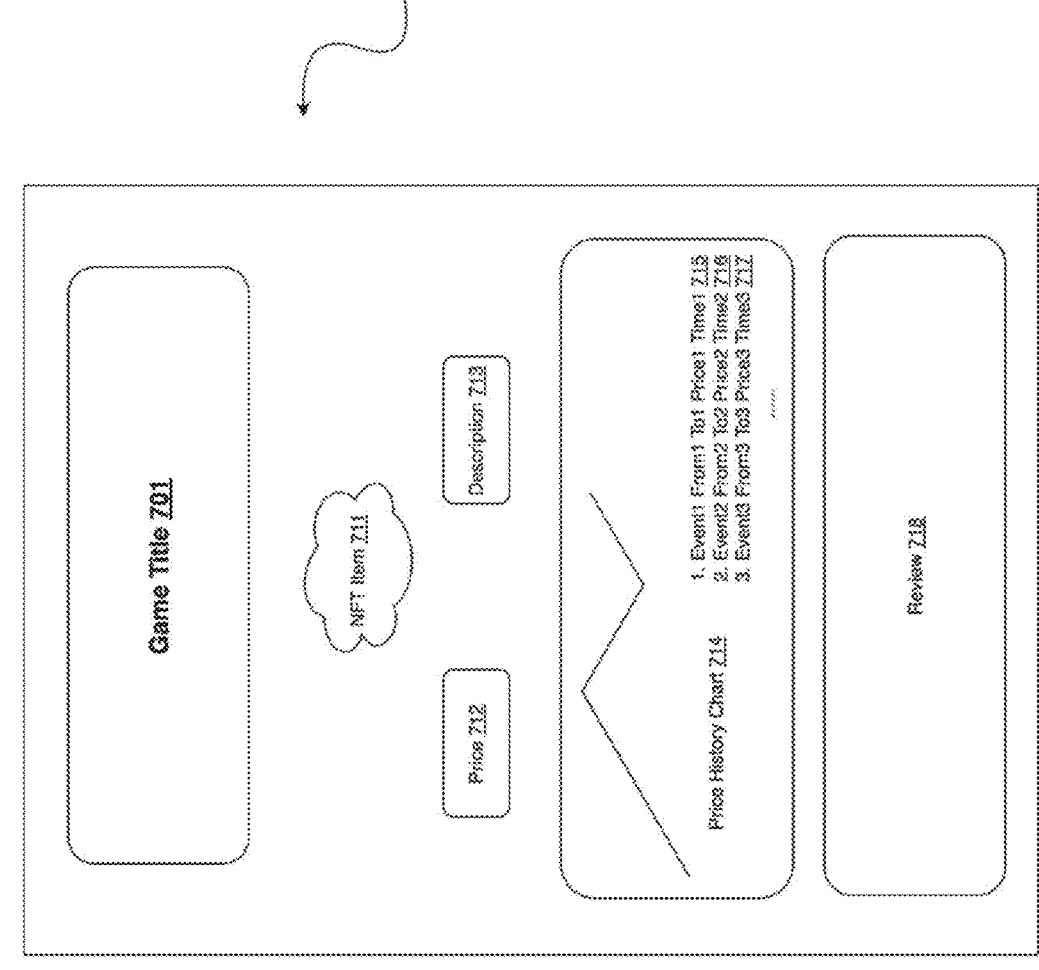

FIG. 10 shows a user interface 700 showing additional details for a particular NFT (e.g., when a user U clicks the details option 622 in FIG. 9). For example, as shown, the interface 700 shows the game title 701, the NFT item image display 711, the NFT price 712, the NFT details usage description 713, the NFT historical price trend chart 714, the NFT historical traceability records 715, 716, 717, other gamers' comments 718 (reviews) regarding the NFT, and/or other information.

In some embodiments, the NFT price 712 shows the current market price of the NFT. Users U may then buy the NFT directly from the developer D on the marketplace 12 at this price and the system 10 updates the status of the NFT within the game in real time (through use of the APIs 111) without the user U and/or developer D having to perform other operations. In this way, the purchased NFT is integrated into the game and ready for use.

In some embodiments, the NFT details usage description 713 shows details of the NFT for users U to review. The detailed description includes, but is not limited to, the usage method in the game, the benefits that can be obtained in the game by using the NFT, the potential value of the NFT, etc.

In some embodiments, the historical price chart 714 of the NFT shows historical prices of this NFT since it was successfully minted on the marketplace 12, thereby enabling users U to have a better understanding of the value of the NFT.

In some embodiments, the NFT's historical traceability records 715, 716, 717 shows historical information of the NFT (e.g., in the form of text), including, but not limited to, the anonymous digital address(s) of the historical owner(s), the anonymous digital address(es) of the historical buyer(s), the historical price(s), the type(s) of events (e.g., transfers, sales, mins, etc.), the date(s) and time(s) of the historical events, and other types of historical information. This may allow users U to trace the history of the NFT asset more clearly.

In some embodiments, reviews of the game/NFTs may be shown in the review section 718. This section 718 may provide a communications area for users U to interact and/or discuss the NFT.

Computing

The services, mechanisms, operations, and acts shown and described above are implemented, at least in part, by software running on one or more computers or computer systems or devices. It should be appreciated that each user device is, or comprises, a computer system.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 11:
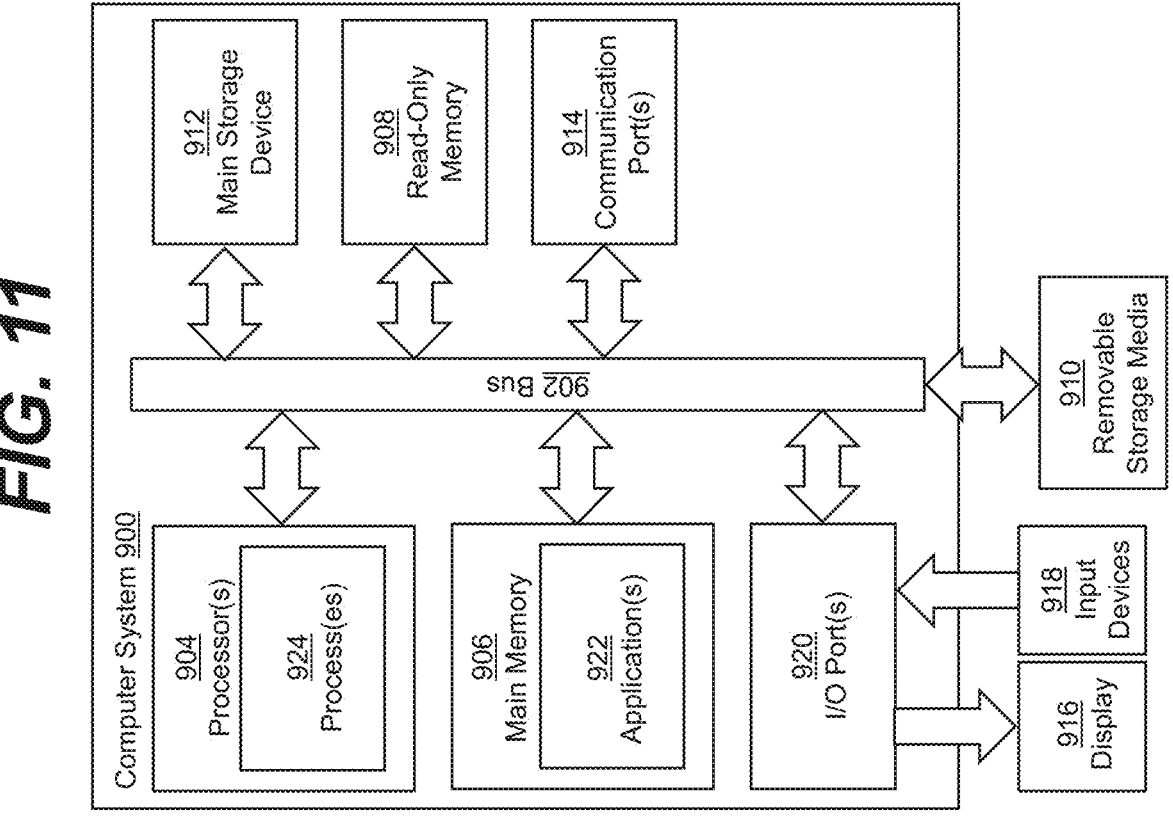
FIG. 11 depicts aspects of computing and computer devices in accordance with exemplary embodiments hereof.

FIG. 11 is a schematic diagram of a computer system 900 upon which embodiments of the present disclosure may be implemented and carried out.

According to the present example, the computer system 900 includes a bus 902 (i.e., interconnect), one or more processors 904, one or more communications ports 914, a main memory 906, removable storage media 910, read-only memory 908, and a mass storage 912. Communication port(s) 914 may be connected to one or more networks by way of which the computer system 900 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 904 can be (or include) any known processor, such as, but not limited to, an Intel® Itanium® or Itanium 2® processor(s), AMD® Opteron® or Athlon MP® processor(s), or Motorola® lines of processors, and the like. Communications port(s) 914 can be any of an RS-232 port for use with a modem-based dial-up connection, a 10/100 Ethernet port, a Gigabit port using copper or fiber, or a USB port, and the like. Communications port(s) 914 may be chosen depending on a network such as a Local Area Network (LAN), a Wide Area Network (WAN), a CDN, or any network to which the computer system 900 connects. The computer system 900 may be in communication with peripheral devices (e.g., display screen 916, input device(s) 918) via Input/Output (I/O) port 920. Some or all of the peripheral devices may be integrated into the computer system 900, and the input device(s) 918 may be integrated into the display screen 916 (e.g., in the case of a touch screen).

Main memory 906 can be Random Access Memory (RAM), or any other dynamic storage device(s) commonly known in the art. Read-only memory 908 can be any static storage device(s) such as Programmable Read-Only Memory (PROM) chips for storing static information such as instructions for processor(s) 904. Mass storage 912 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 902 communicatively couples processor(s) 904 with the other memory, storage and communications blocks. Bus 902 can be a PCI/PCI-X, SCSI, a Universal Serial Bus (USB) based system bus (or other) depending on the storage devices used, and the like. Removable storage media 910 can be any kind of external hard-drives, floppy drives, IOMEGA® Zip Drives, Compact Disc-Read Only Memory (CD-ROM), Compact Disc—Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor, or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g., sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 906 is encoded with application(s) 922 that support(s) the functionality as discussed herein (an application 922 may be an application that provides some or all of the functionality of one or more of the mechanisms described herein). Application(s) 922 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 904 accesses main memory 906 via the use of bus 902 in order to launch, run, execute, interpret or otherwise perform the logic instructions of the application(s) 922. Execution of application(s) 922 produces processing functionality of the service(s) or mechanism(s) related to the application(s). In other words, the process(es) 924 represents one or more portions of the application(s) 922 performing within or upon the processor(s) 904 in the computer system 900.

It should be noted that, in addition to the process(es) 924 that carries (carry) out operations as discussed herein, other embodiments herein include the application 922 itself (i.e., the un-executed or non-performing logic instructions and/or data). The application 922 may be stored on a computer readable medium (e.g., a repository) such as a disk or in an optical medium. According to other embodiments, the application 922 can also be stored in a memory type system such as in firmware, read only memory (ROM), or, as in this example, as executable code within the main memory 906 (e.g., within Random Access Memory or RAM). For example, application 922 may also be stored in removable storage media 910, read-only memory 908, and/or mass storage device 912.

Those skilled in the art will understand that the computer system 900 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

It is understood that any aspect and/or element of any embodiment of the system 10 described herein or otherwise may be combined with any other aspect and/or element of any other embodiment described herein or otherwise in any way to form additional embodiments of the system 10 all of which are within the scope of the system 10.

Where a process is described herein, those of ordinary skill in the art will appreciate that the process may operate without any user intervention. In another embodiment, the process includes some human intervention (e.g., a step is performed by or with the assistance of a human).

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method comprising:

(A) receiving from a developer of a first non-fungible token (NFT), over a network, first information pertaining to the first NFT, the first information in a first format;

(B) connecting, over a network, with a first gaming environment that accepts NFTs, the NFTs required by the first gaming environment to be in a second format;

(C) connecting, over a network, with a second gaming environment that accepts NFTs, the NFTs required by the second gaming environment to be in a third format;

(D) receiving, over a network, a request to mint the first NFT for use with the first gaming environment and to mint the first NFT for use with the second gaming environment;

(E) converting, by a computer system, the first information into the second format and into the third format;

(F) minting, by a computer system, the first NFT for use with the first gaming environment using the second format and the first NFT for use with the second gaming environment using the third format.

2. The method of claim 1 further comprising:

(A)(1) providing the developer of the first NFT with first application programming interfaces (APIs) pertaining to the first gaming environment and/or the second format;

(A)(2) providing the developer with second APIs pertaining to the second gaming environment and/or the third format.

3. The method of claim 1, further comprising:

(G) making available, over a network, the minted first NFT in the second format and in the third format.

4. The method of claim 3 wherein the making available the minted first NFT in the second format and in the third format in (G) includes:

providing a single interface where a first player can access the first gaming environment including the first NFT in the second format and the second gaming environment including the first NFT in the third format.

5. The method of claim 4 wherein the system hosts a private key for the first player within a system database.

6. A method comprising:

(A) receiving, over a network, first information pertaining to a first non-fungible token (NFT) from a first NFT developer, the first information in a first format;

(B) connecting, over a network, with a first gaming environment that accepts second NFTs, the second NFTs required by the first gaming environment to be in a second format;

(C) connecting, over a network, with a second gaming environment that accepts third NFTs, the third NFTs required by the second gaming environment to be in a third format;

(D) receiving, over a network, a request from the first developer to mint the first NFT for availability within the first gaming environment and to mint the first NFT for availability within the second gaming environment;

(E) converting, by a computer system, the first information into the second format to form first converted first information and into the third format to form second converted first information;

(F) minting, by a computer system, the first NFT using the first converted first information to form a first minted NFT and making the first minted NFT available to a first player within the first gaming environment independent of a first physical location of the first player; and (G) minting, by a computer system, the first NFT using the second converted first information to form a second minted NFT and making the second minted NFT available to the first player within the second gaming environment independent of the first physical location of the first player.

7. The method of claim 6 further comprising:

(H) providing a single interface where the first player can access the first gaming environment including the first minted NFT and the second gaming environment including the second minted NFT.

8. The method of claim 7 wherein the computer system hosts a private key for the first player within a system database.

9. The method of claim 6 further comprising:

(B)(1) providing the first NFT developer with first application programming interfaces (APIs) pertaining to the first gaming environment and/or the second format;

(C)(1) providing the first NFT developer with second APIs pertaining to the second gaming environment and/or the third format.

* * * * *